(12) United States Patent
Wu et al.

(10) Patent No.: US 11,533,008 B2
(45) Date of Patent: Dec. 20, 2022

(54) METHOD FOR DETERMINING THE ROTATIONAL POSITION OF A ROTOR IN A PERMANENT MAGNET SYNCHRONOUS MACHINE

(71) Applicant: Siemens Gamesa Renewable Energy A/S, Brande (DK)

(72) Inventors: Ximeng Wu, Sheffield (GB); Zhan-Yuan Wu, Sheffield (GB); Zi-Qiang Zhu, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 126 days.

(21) Appl. No.: 16/707,240

(22) Filed: Dec. 9, 2019

(65) Prior Publication Data
US 2020/0195178 A1 Jun. 18, 2020

(30) Foreign Application Priority Data
Dec. 12, 2018 (EP) .................................... 18211866

(51) Int. Cl.
*H02P 6/20* (2016.01)
*H02P 6/22* (2006.01)
*H02P 6/185* (2016.01)

(52) U.S. Cl.
CPC ................ *H02P 6/185* (2013.01); *H02P 6/20* (2013.01); *H02P 6/22* (2013.01)

(58) Field of Classification Search
CPC .... H02P 6/185; H02P 1/46; H02P 6/22; H02P 6/157; H02P 6/182
(Continued)

(56) References Cited

U.S. PATENT DOCUMENTS

| 6,650,082 B1* | 11/2003 | Du ........................... H02P 6/20 318/701 |
| 2008/0018279 A1 | 1/2008 | Fukamizu et al. |

(Continued)

FOREIGN PATENT DOCUMENTS

| EP | 2706659 A1 | 3/2014 |

OTHER PUBLICATIONS

Y.-S. Lai, F.-S. Shyu, and S. S. Tseng, "New initial position detection technique for three-phase brushless DC motor without position and current sensors," IEEE Trans. on Industry Applications, vol. 39, No. 2, pp. 485-491, Mar. 2003.
(Continued)

*Primary Examiner* — Bickey Dhakal
*Assistant Examiner* — Zemenay T Truneh
(74) *Attorney, Agent, or Firm* — Schmeiser, Olsen & Watts LLP (57) ABSTRACT

Provided is a method for determining the rotational position of a rotor in a permanent magnet synchronous machine, wherein the stator includes windings for a first, second and third phase, including the steps: applying a first voltage pulse to the first phase, determining respective first measures for the current induced by the first voltage pulse in the second and third phase, selecting a first selected phase depending on the first measures for the current, wherein the first selected phase is either the second or the third phase, applying a second voltage pulse to the first selected phase, determining respective second measures for the current induced by the second voltage pulse in the phases of the stator that are not the first selected phase, and determining the rotational position of the rotor depending on the second measures of the current.

14 Claims, 6 Drawing Sheets

(58) Field of Classification Search
USPC .................................................. 318/400.33
See application file for complete search history.

(56) References Cited

U.S. PATENT DOCUMENTS

| | | | |
|---|---|---|---|
| 2010/0026223 A1* | 2/2010 | Liu ........................ | H02P 21/32 |
| | | | 318/400.33 |
| 2013/0069638 A1 | 3/2013 | Vollmer | |
| 2015/0054441 A1* | 2/2015 | Schwarzkopf .......... | H02P 6/182 |
| | | | 318/400.33 |

OTHER PUBLICATIONS

P. Champa, P. Somsiri, P. Wipasuramonton, and P. Nakmahachalasint, "Initial rotor position estimation for sensorless brushless DC drives," IEEE Trans. on Industry Applications, vol. 45, No. 4, pp. 1318-1324, Jul. 2009; 2009.

S. Nakashima, Y. Inagaki, and I. Miki, "Sensorless initial rotor position estimation of surface permanent-magnet synchronous motor," IEEE Trans. on Industry Applications, vol. 36, No. 6, pp. 1598-1603, Nov. 2000.

W. J. Lee and S. K. Sul, "A new starting method of BLDC motors without position sensor," IEEE Trans. on Industry Applications, vol. 42, No. 6, pp. 1532-1538, Nov. 2006.

P. B. Schmidt, M. L. Gasperi, G. Ray, and A. H. Wijenayake, "Initial rotor angle detection of a nonsalient pole permanent magnet synchronous machine," in , Conference Record of the 1997 IEEE Industry Applications Conference, 1997. Thirty-Second IAS Annual Meeting, IAS '97, 1997, vol. 1, pp. 459-463 vol. 1; 1997.

European Search Report dated Jun. 7, 2018 for Application No. 18211866.1.

\* cited by examiner

METHOD FOR DETERMINING THE ROTATIONAL POSITION OF A ROTOR IN A PERMANENT MAGNET SYNCHRONOUS MACHINE

CROSS-REFERENCE TO RELATED APPLICATIONS

This application claims priority to European Application No. 18211866.1, having a filing date of Dec. 12, 2018, the entire contents of which are hereby incorporated by reference.

FIELD OF TECHNOLOGY

The following relates to a method for determining the rotational position of a rotor in a permanent magnet synchronous machine, wherein the stator comprises windings for a first, second and third phase. Additionally, the following relates to a control unit of a permanent magnet synchronous machine, a computer program and a computer-readable storage medium.

BACKGROUND

For controlling a permanent magnet synchronous machine, it is typically necessary to at least approximately determine a rotational position of the rotor of the machine to determine appropriate control signals for the windings of the different phases of the machine. The rotational position can be determined using at least one additional sensor. To reduce the cost and complexity of the machine it is however advantageous to use a sensorless control of the permanent magnet synchronous machine.

Such sensorless monitoring approaches are known from the document EP 2 706 659 A 1. The monitoring is based on a voltage signal indicative for a back electromotive force being induced in the stator.

The back electromotive force is however zero at standstill. Therefore, approaches based on this phenomenon cannot be used at standstill and therefore have only limited usefulness if the start up of the machine should be controlled.

SUMMARY

An aspect relates to a sensorless approach to determining a rotational position of the rotor of the permanent magnet synchronous machine at standstill, that preferably allows for a fast and precise determination of the rotational position.

This problem is solved by a method for determining the rotational position of a rotor in a permanent magnet synchronous machine, wherein the stator comprises windings for a first, second and third phase, comprising the steps:
  applying a first voltage pulse to the first phase,
  determining respective first measures for the current induced by the first voltage pulse in the second and third phase,
  selecting a first selected phase depending on the first measures for the current, wherein the first selected phase is either the second or the third phase,
  applying a second voltage pulse to the first selected phase,
  determining respective second measures for the current induced by the second voltage pulse in the phases of the stator that are not the first selected phase, and
  determining the rotational position of the rotor depending on the second measures of the current.

The method takes advantage of the fact that the permanent magnets arranged on the rotor can cause a complete or at least partial magnetic saturation of the stator material, e.g. the stator iron, in the area next to the respective magnet. If the coil of certain phase is in the vicinity of the permanent magnet the inductance of that coil is therefore lowered. If a voltage is applied to the windings of a certain phase, the time derivative of the resulting current depends on the inductance of these windings. The inductance of the windings of a phase can therefore be easily determined by applying a voltage pulse and measuring a current response. A measure for the current that can be used to determine the inductance can e.g. be the maximum or an average or an integral of the current over a given time interval after the application voltage pulse and/or a maximum or an average or an integral of the time differential of that current. Since the inductance of the windings of a respective phase depend on the degree of saturation of the stator material in the area of these windings the measure for the current is also a measure that determines the degree of alignment of the rotor with the windings of a certain phase. The measure for the current in the respective phase can therefore indicate how well the permanent magnets of the rotor are aligned with the windings of that phase. By using multiple voltage pulses and current measurements a rotational position of the rotor can therefore be determined.

It should be noted that the determined rotational position describes an electrical angle of the rotor position, which is sufficient to control the permanent magnet synchronous machine. If the number of pole pairs of the machine is one this electrical angle corresponds unambiguously to one physical orientation of the rotor. If a machine with multiple pole pairs is used, a single physical orientation corresponds to a number of electrical cycles that is identical to the number of pole pairs.

In principle it would be possible to determine the rotational position of the rotor by using a fixed pattern of applying voltage pulses to different phases with different polarities. This would however require a relatively large number of voltage pulses to provide the rotational position of the rotor with sufficient precision to reliably control the start up of a permanent magnet synchronous machine with sufficient torque. Therefore, the inventive method uses a variable pulse sequence, wherein the second voltage pulse is applied to a phase that is selected based on measurement data acquired by using the first voltage pulse. As will be described in more detail below this dynamic adaption of the pulse sequence allows for sufficiently precise determination of a rotational position of the rotor using only a few voltage pulses.

In a permanent magnet synchronous machine, the voltage applied to each of the phases is typically not controlled independent of each other. Due to a star or delta connection of the windings of the different phases and/or due to the use of a three phase inverter an injection of a pulse of a given polarity into one of the phases leads to an injection of a pulse with the inverted polarity to the other two phases. If e.g. a positive voltage pulse is applied to the first phase, a positive current will result in the first phase and a negative current will result in the second and third phase. When the application of a voltage pulse to a given phase is discussed, this therefore means that a voltage pulse with a given polarity is applied to that phase and a voltage pulse with an inverted polarity is applied to the other phases.

The step of determining the rotational position of the rotor depending on the second measures of the current can comprise the steps of:

selecting a second selected phase depending on the second measures of the current, wherein the second selected phase is either the first phase or the first selected phase, applying a third voltage pulse to the second selected phase, determining a respective third measure for the current induced by the third voltage pulse in at least one phase of the stator, and determining the rotational position of the rotor depending on the third measure for the current.

As discussed in more detail below the application of a third voltage pulse to a second selected phase that is determined in dependence of the previous measurement data allows for an unambiguous determination of an electrical phase with a relatively low margin of error and therefore for a robust control of a permanent magnet synchronous machine, especially of the start up of the permanent magnet synchronous machine.

The first and third voltage pulse or the second and third voltage pulse can be applied to the same phase with opposite polarities. This is useful to distinguish between rotor orientations that differ in their electrical phase by 180°. In the previous discussion only the saturation of the stator material by the magnetic fields of the permanent magnets was considered. An additional magnetic field is however caused by the current through the windings of the respective phase. The direction of the magnetic field caused by this current depends on the polarity of the voltage pulse. Depending on this direction and the direction of the field of the permanent magnet in the vicinity of the respective winding the magnetic field of the winding of the phase either increases or decreases the saturation of the stator material and therefore either further decreases or slightly increases the inductance of the respective winding. By comparing currents caused by voltage pulses to the same phase with opposite polarities rotational positions with a difference in the electric angle of 180° can therefore be distinguished and the rotational position can therefore be disambiguated.

The respective third measure of the current can be determined for the current in the second selected phase and/or in the phases of the stator that are not the second selected phase. Acquiring a measure of the current in the second selected phase is especially advantageous to perform the previously discussed disambiguation. Measuring the current in the phases of the stator that are not the second selected phase is useful to improve the accuracy of the determined rotational position of the rotor. Without this measurement it might only be known that the electrical phase is within a certain interval that is symmetric about the angular position of the windings of a certain phase. The third measures of the current in the phases of the stator that are not the second selected phase can be used to determine towards which of the phases the angular position deviates from the second selected phase.

The determined rotational position can depend on the relative magnitudes of the third measures of the current for the phases of the stator that are not the second selected phase. As previously discussed, this can determine in which direction the rotational position of the rotor and therefore the position of the permanent magnets deviates from the position of the windings of the second selected phase.

An additional first measure for the current induced by the first voltage pulse in the first phase and/or an additional second measure for the current induced by the second voltage pulse in the selected phase can be determined, wherein the selection of the second selected phase and/or the determined rotational position depend on the additional first and/or the additional second measure for the current. As previously discussed, these measures allow for robust disambiguation between two rotational positions that differ by 180°. Additionally, the use of the additional first measure for the current can improve the estimation of an approximate rotational position after the second voltage pulse and therefore the selection of the second selected phase.

The determined rotational position can depend on the relative magnitude of the third measure of the current for the second selected phase and the additional first or the additional second measure of the current. As discussed, the relative orientation of the magnetic field of the permanent magnets and a field induced by the respective windings due to the voltage pulse influences the degree of saturation of the stator material and therefore the inductance of the respective windings and therefore the current in the respective phase. If the first and third voltage pulse or the second and third voltage pulse are applied to the same phase with opposite polarities as previously discussed and this phase roughly aligns with orientation of the permanent magnet the relative magnitude of the third measure of the current for the second selected phase and the additional first or the additional second measure of the current will provide information in which direction in the northpole of the permanent magnets of the rotor points. The measurement is therefore not only sensitive to the magnitude of the magnetic field in the region of the windings of the respective phase but also on the direction of the magnetic field.

The absolute value of the difference between the additional first and the additional second measure of the current can be compared to a threshold, wherein the selection of the second selected phase and/or the determined rotational position depend on the result of that comparison. The comparison of the difference to the threshold in this case and in further cases discussed later serves to identify rotational positions of the rotor in which the permanent magnets of the rotor are in roughly the same distance to the windings of the considered phases. This is especially advantageous when the alternative would be to proceed on two different branches of the method depending on the relative magnitude of the two considered measures for the current. If those currents are rather similar and therefore the difference is below the threshold, even a small measurement error could lead to a wrong branch of the method and therefore potentially to a big error in the determined rotational position of the rotor. It is therefore advantageous to identify these cases and treat some separately.

The selection of the first and/or second selected phase and/or the determined rotational position can depend on the relative magnitude of the first measures of the current for the second and third phase and/or the selection of the second selected phase and/or the determined rotational position can depend on the relative magnitude of the second measures of the current for the phases of the stator that are not the first selected phase. As previously discussed, the method can branch depending on the respective relative magnitude, therefore leading to the selection of different phases to apply voltage pulses to and/or the selection of different processing steps. This dynamic branching of the method in dependence of relative magnitudes of measures of the current of respective phases and the application of respective voltage pulses allows for a fast and efficient determination of the rotational position.

The absolute value of the difference between the first measures of the current for the second and third phase can be compared to a threshold, wherein the selection of the first and/or second selected phase and/or the determined rotational position depend on the result of that comparison. Additionally or alternatively the absolute value of the difference between the second measures of the current for the phases of the stator that are not the first selected phase can be compared to a threshold, wherein the selection of the second selected phase and/or the determined rotational position depend on the result of that comparison. As previously discussed, the separate treatment of cases in which measures for the current for the respective voltage pulse are very similar for two phases can help to avoid errors due to noise or small measurement errors. This is especially advantageous when a comparison of the magnitudes of the measures for the current determine the phase to which the next voltage pulse is applied, since a branching of the method is required in these cases.

In the method according to embodiments of the present invention exactly three voltage pulses can be applied to determine the rotational position. The error in the determined rotational position can be smaller than or equal to 15°. This can be achieved by selecting the phases to which to apply the voltage pulses and/or the further processing of the measures for the current in different ways depending on previously acquired measurements as previously discussed.

In addition to the inventive method, embodiments of the invention concern a control unit of a permanent magnet synchronous machine that is configured to perform the method according to embodiments of the present invention. It can also be said that embodiments of the invention concern a permanent magnet synchronous machine comprising such a control unit and/or a larger system, e.g. a wind turbine, which comprises a permanent magnet synchronous machine and the described control unit. In wind power generators a permanent magnet synchronous machine controlled by such a control unit might e.g. be used to orient the blades or it could be used as a generator of the wind turbine and the described method could e.g. be used to start the turbine at low wind speeds. A permanent magnet synchronous machine controlled by the described control unit or method can especially provide large torques from the standstill and therefore start up under large loads.

Additionally, embodiments of the invention concern a computer program that can be directly loaded into a memory unit of a control unit of a permanent magnet synchronous machine, the computer program comprising instructions for performing the steps of the inventive method when the program is executed in the control unit.

The embodiments also concern a computer-readable storage medium containing electronically readable instructions comprising the computer program according to embodiments of the present invention.

BRIEF DESCRIPTION

Some of the embodiments will be described in detail, with reference to the following figures, wherein like designations denote like members, wherein.

DETAILED DESCRIPTION

Figure 1:
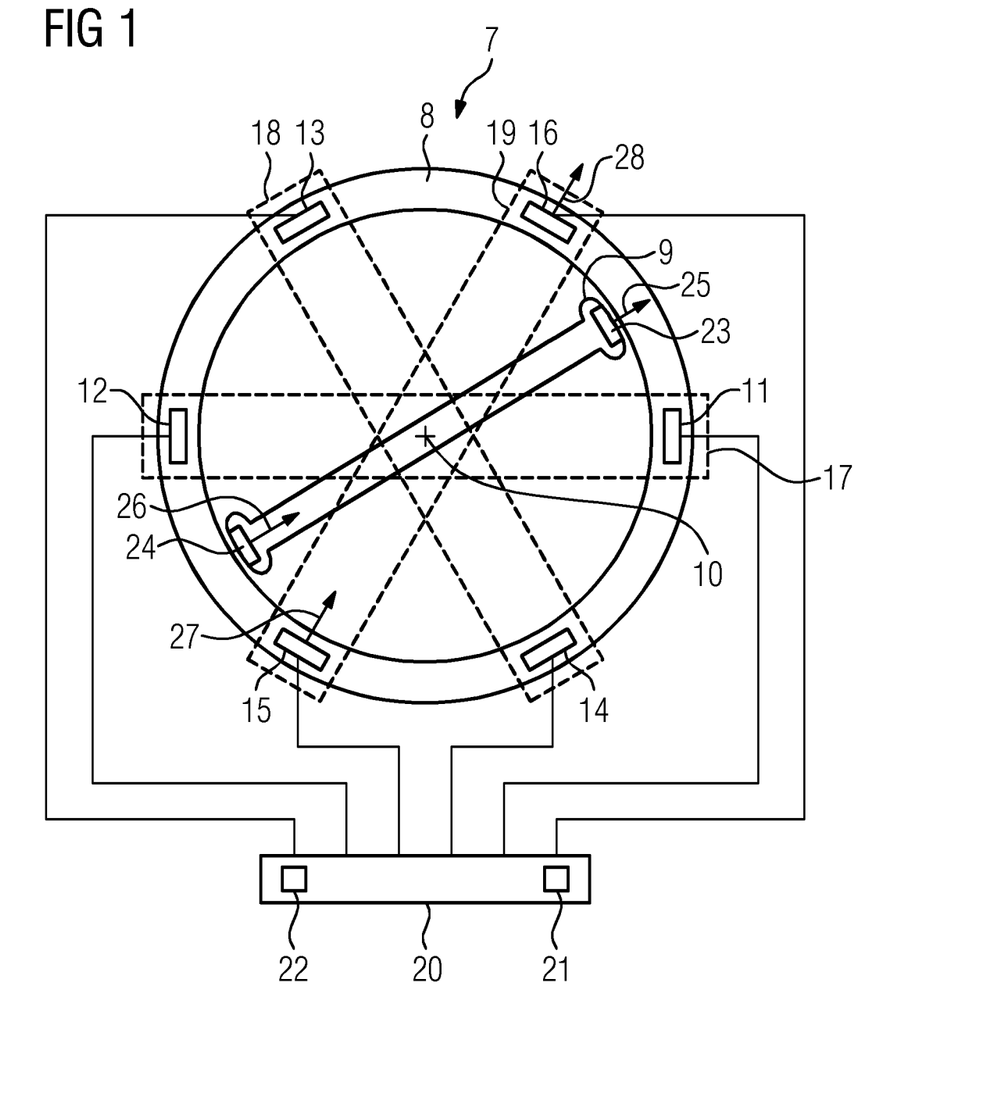
FIG. 1 a permanent magnet synchronous machine comprising a control unit according to an embodiment of the present invention, FIG. 2 a flow chart of an embodiment of the present invention, FIG. 3 the relative position of different sectors of the rotational position and the windings of the permanent magnet synchronous machine shown in FIG. 1.

FIG. 1 shows a permanent magnet synchronous machine 7. The machine 7 comprises a stator 8 and a rotor 9. The rotor is rotatable around the axis 10. In the example the machine 7 comprises one pole pair and the rotor 9 is therefore carrying two permanent magnets 23, 24 that provide a magnetic field 25, 26 that is oriented in the same direction. The stator 8 comprises multiple windings 11-16 to which a voltage can be applied by the control unit 20. The control unit 20 comprises a memory unit 21 what stores a computer program for controlling the permanent magnet synchronous machine 7 and a processor 22 for executing the steps of that program.

The windings 11-16 are connected in such a way that the windings 11, 12 form a first phase 17, the windings 13, 14 form a second phase 18 and the windings 15, 16 form a third phase 19. When a voltage with a given polarity is applied to one of these phases both windings 11-16 of that phase 17, 18, 19 generate a magnetic field 27, 28 in the same direction. In the example a negative voltage is applied to the third phase 19. Due to the interactions of the magnetic fields 25-28 the rotor 9 would experience a torque in the counter-clockwise direction in FIG. 1. By applying a voltage with an opposite polarity to the phase 19 a torque in the clockwise direction could be applied.

The control circuit and the wiring of the phases are only shown schematically in FIG. 1. In a real life application, a star or delta connection is typically used to connect the phases 17, 18, 19 and the machine 7 can be driven by a three phase convertor. Therefore the application of a voltage with a first polarity to one of the phases 17, 18, 19 results in the application of a voltage pulse with an inverted polarity to the remaining phases 17, 18, 19. If e.g. a negative voltage pulse is applied to the third phase 19, resulting in the magnetic fields 27, 28 shown in FIG. 1, positive voltage pulses would be applied to the further phases 17, 18 at the same time.

To start the machine 7 from standstill it is highly relevant to know the rotational position of the rotor 9 with a reasonably high accuracy. A method for determining the rotational position that is implemented by the control unit 20 is now discussed with reference to FIG. 2. With this method it is possible to determine the rotational position with an accuracy of 30°. This allows to determine in which of the sectors 1a-6b shown in FIG. 3 the permanent magnet 23 is currently located. The position shown in FIG. 1 would therefore lead to a determination of the sector 2a.

Figure 2:
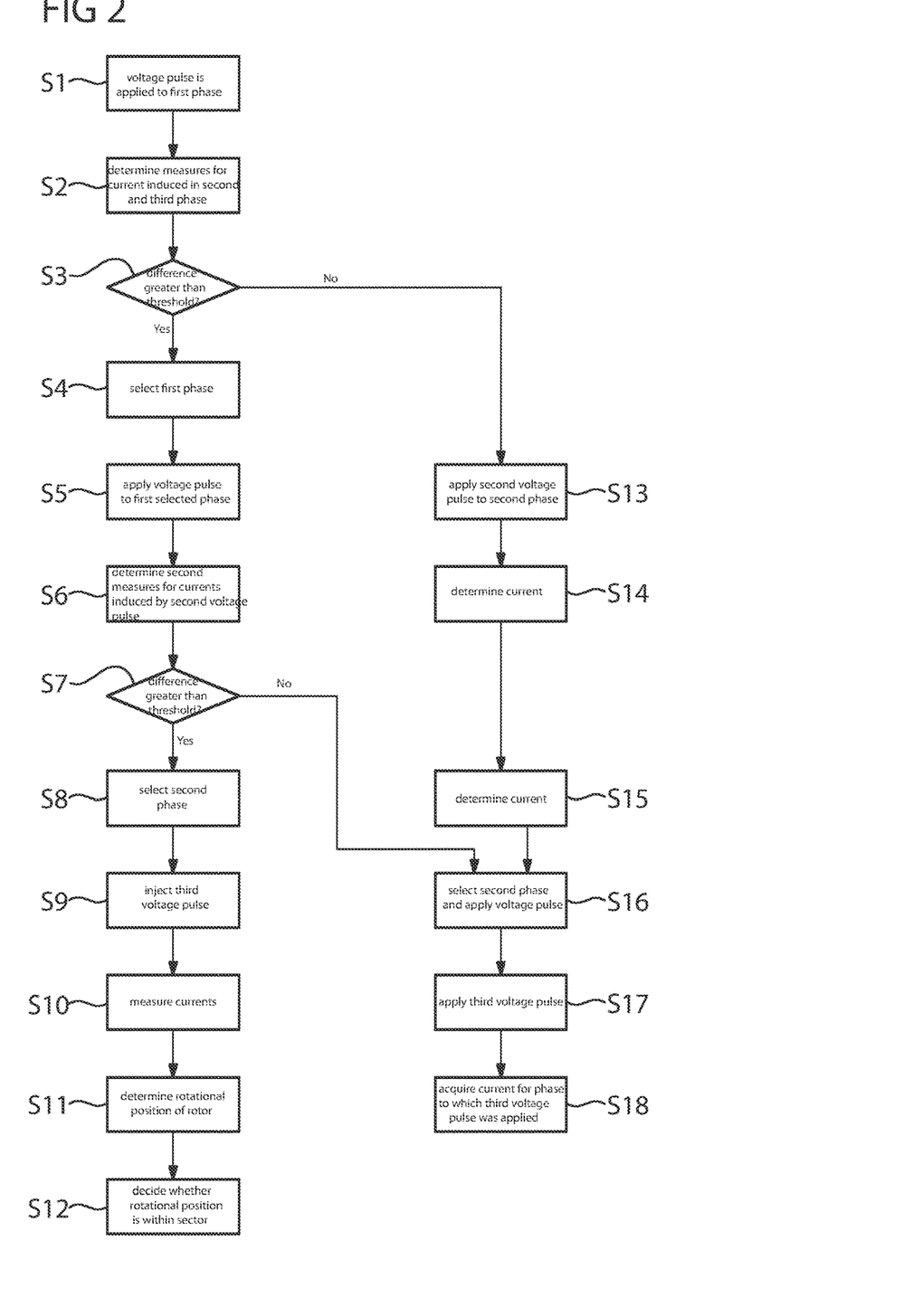
Figure 4:
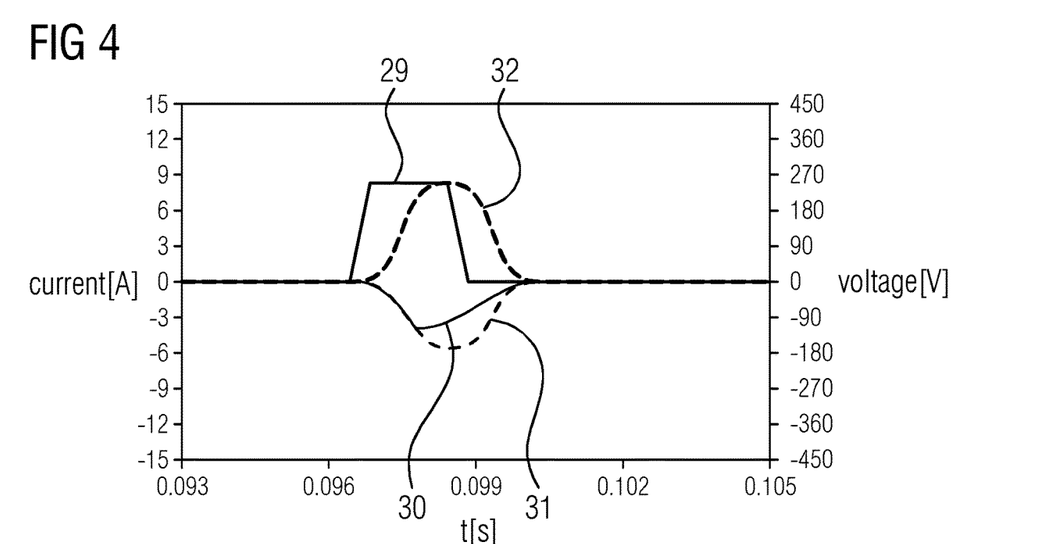
FIG. 4 depicts a current response for a phase when applying a voltage pulse.

In step S1 a first voltage pulse 29 is applied to the first phase 17 and therefore to the windings 10 and 12. As shown in FIG. 4, the first voltage pulse 29 is applied with a positive polarity. As previously discussed, using a star or delta connection and using a three phase convertor for the application of the voltage pulse lead to the application of a negative voltage pulse to the second and third phase 18, 19 when applying the positive first voltage pulse 29 to the first phase 17.

In step S2 respective first measures for the current 30 induced in the second phase 18 and for the current 31 induced in the third phase 19 by the application of the first voltage pulse 29 are determined. The measured currents 30, 31 are shown in FIG. 4. In the discussed example the maximum current in the shown time interval is used as the measure for the respective current 30, 31. Alternatively it would e.g. be possible to determine an average current or an integral of the current during that time interval or to calculate an average or maximum gradient of the respective current 30, 31. Additionally an additional first measure for the current 32 in the first phase 17 is acquired.

In step S3 the absolute value of the difference between the first measures for the currents 30, 31 is compared to a threshold. This comparison is used to ensure that a difference in these measures is larger than a potential measurement error. If the difference is smaller than threshold the method will branch to step S13. The modified determination of the rotational position for this case will be discussed later. If the difference of the first measures of the current 30, 31 does however exceed the threshold the method continuous to step S4.

In step S4 one of the phases 18, 19 is selected as a first selected phase. The selection of the selected phase depends on the relative magnitude of the first measures for the current 30, 31. The selected phase will be the second phase 18 if the first measure of the current 30 for this phase is larger than the first measure for the current 31 for the phase 19 and vice versa. Therefore, the first selected phase is the phase in which a larger current is induced. As previously discussed, the magnitude of the induced current 30, 31 depends on the inductance of the windings 13-16 of the respective phase 18, 19 and this inductance depends on the degree of saturation of the stator material in the area of the respective windings 13-16. As seen in FIG. 1 the permanent magnets 23, 24 are closer to the areas of the winding 15, 16 of the third phase 19, leading to a current 31 in the third phase 19 that is larger than the current 30 in the second phase 18. Therefore, the third phase 19 is selected as the selected phase.

Figure 5:
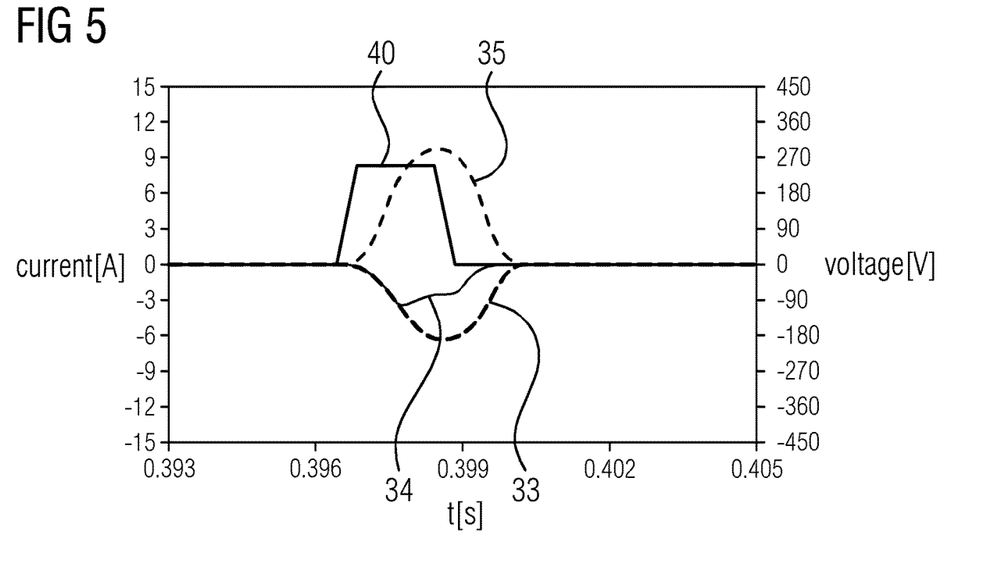
FIG. 5 depicts a current response for a phase when applying a voltage pulse.

In step S5 a second voltage pulse 40 that is shown in FIG. 5 is applied to the first selected phase and therefore to the third phase 19 in the example shown in FIG. 1. In step S6 second measures for the currents 33, 34 induced by the second voltage pulse 40 in the phases of the stator 8, that are not the selected phase, are determined. The current 33 is the current induced in the first phase 17 and the current 34 is the current induced in the second phase 18. To improve accuracy and to allow for a later determination of the polarity, e.g. if the permanent magnet is located in the sector 2a or 5a, additionally a second measure for the current 35 in the selected phase and therefore in the third phase 19 is acquired.

In step S7 the absolute value of the difference between the measures for the currents 33, 34 is compared to a threshold as previously discussed with respect to step S3. If the difference is below that threshold the further determination is modified as will be explained later. If the difference does however exceed this threshold the method continues to step S8.

In step S8 a second selected phase is selected depending on the second measures for the currents 33, 34 acquired in step S6. The second selected phase is typically selected in such a way that the permanent magnets 23, 24 are expected to be roughly aligned with the windings 11-16 of the respective phase 17, 18, 19. In the discussed example the current 34 in the second phase 18 is smaller than the current 33 in the first phase 17. Since the currents 30, 34 in the second phase 18 are smallest for both voltage pulses 29, 40, the inductance in the windings 13, 14 of the second phase 18 is obviously high and the rotor 9 is therefore obviously not aligned with the windings 13, 14 of the second phase 18. To determine whether the rotational position of the rotor 9 is more closely aligned with the windings 11, 12 of the first phase 17 or with the winding 15, 16 of the third phase 19 the measures for the currents 32 and 35 are compared. In the discussed example the current 35 is larger than the current 32 indicating a stronger saturation of the magnetization in the stator material in the area of the windings 15, 16 than in the area of the windings 11, 12. It can therefore be determined, that the rotational position of the rotor 9 is roughly aligned with the windings 15, 16 of the third phase 19. If on the other hand the current 32 would be larger than the current 35 a rough alignment with the windings 11, 12 of the first phase 17 would be determined. If the currents 32, 35 would be roughly equal it would be obvious that the rotational position of the rotor 9 would be between the phases 17 and 19 and therefore the rotational position would be 30° or 210° when 0° is associated with the first phase 17.

Figure 6:
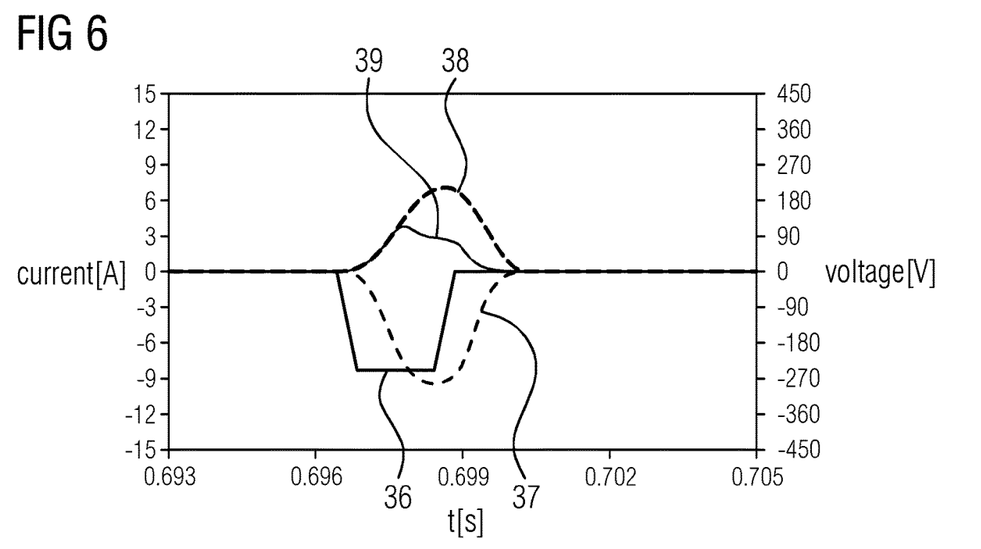
FIG. 6 depicts a current response for a phase when applying a voltage pulse.

The phase which is expected to be roughly aligned with the rotor 9 is the second selected phase into which a third voltage pulse is injected in step S9 and the currents 37, 38, 39 shown in FIG. 6 are measured in step S10. Therefore, the third voltage pulse would be injected into the third phase 19 in the discussed example. If the currents 32, 35 are roughly equal either phase could be used for injection of the third voltage pulses. In the discussed example the third phase 19 would be used for injection of the third voltage pulse in that case.

The primary purpose of the third voltage pulse 36, that is shown in FIG. 6, is to distinguish between rotational position that are shifted by 180°. This is possible since the second selected phase into which the voltage pulse 36 is injected is the same phase into which the voltage pulse 40 was already injected, but the polarity of the injection is reversed. If the phase 17 would be selected as a second selected phase in step S8 this would apply to the voltage pulses 29, 36. The polarity of the voltage pulse will determine the direction of the magnetic fields 27, 28 induced by the windings 11-16 of the respective phase 17, 18, 19. The direction shown in FIG. 1 corresponds to a negative voltage pulse applied to the phase 19. If the direction of the magnetic field 25, 26 of a respective permanent magnet 23, 24 is aligned with the direction of the magnetic field 27, 28 of the closest winding 11-16, the magnetic saturation of the stator material is further increased. An opposite direction of these magnetic fields would lead to decrease in the saturation. Since a higher saturation leads to a reduced inductance and therefore to a higher current, the relative polarity of the magnetic field can be determined by comparing the measures for the currents 35, 37 induced in the respective phase 19 when applying voltage pulses 36, 40 to the same phase 19 with different polarities. In the discussed example the current 37 for the negative voltage pulse 36 is larger than the current 35 for the positive voltage pulse 40 indicating that the magnetic fields 25, 26 for the permanent magnets 23, 24 are roughly aligned with the magnetic fields 27, 28 caused by applying a negative voltage pulse to the phase 19. It can therefore be determined in step S11 that the permanent magnet 23 and therefore the rotational position of the rotor 9 is in the sector 2a or 2b shown in FIG. 3.

Figure 3:
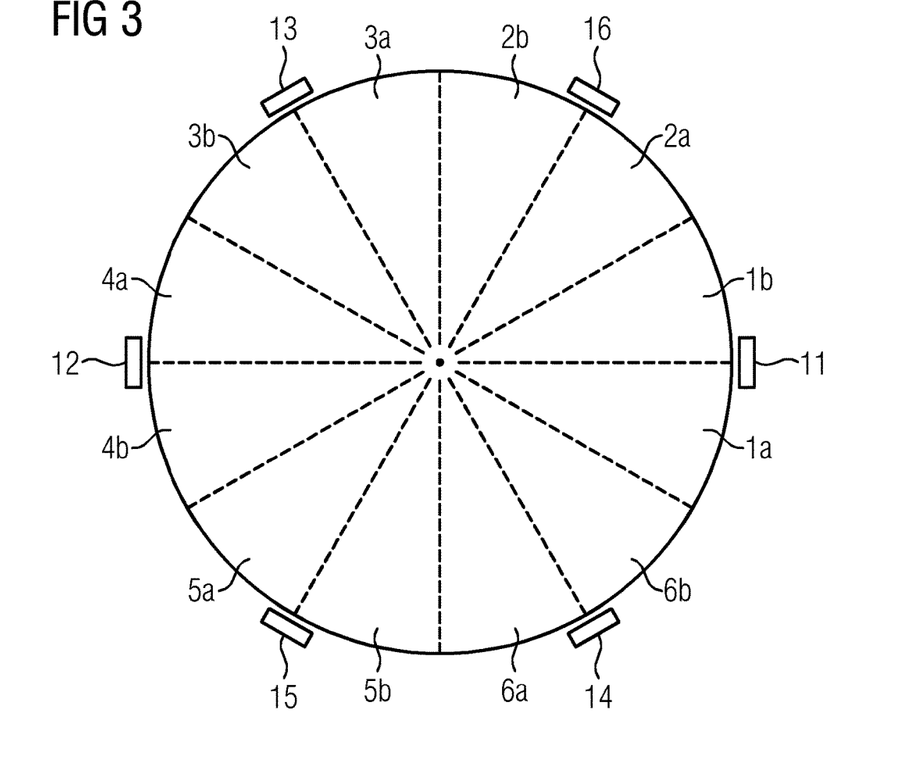

In step S12 the precision is increased by deciding whether the rotational position is within sector 2a or sector 2b. To achieve this the current 38 induced in the phase 17 and the current 39 induced in the phase 18 are additionally acquired in step S10 and compared to each other in step S12. If the measure for the current 38 is larger than the measure for the current 39 as shown in FIG. 6, this indicates that the permanent magnets 23, 24 are positioned closer to the windings 11, 12 of the first phase 17 than to the windings 13, 14 of the second phase 18 and vice versa. In the present example it can therefore be determined that the rotational position is in the sector 2a.

Figure 7:
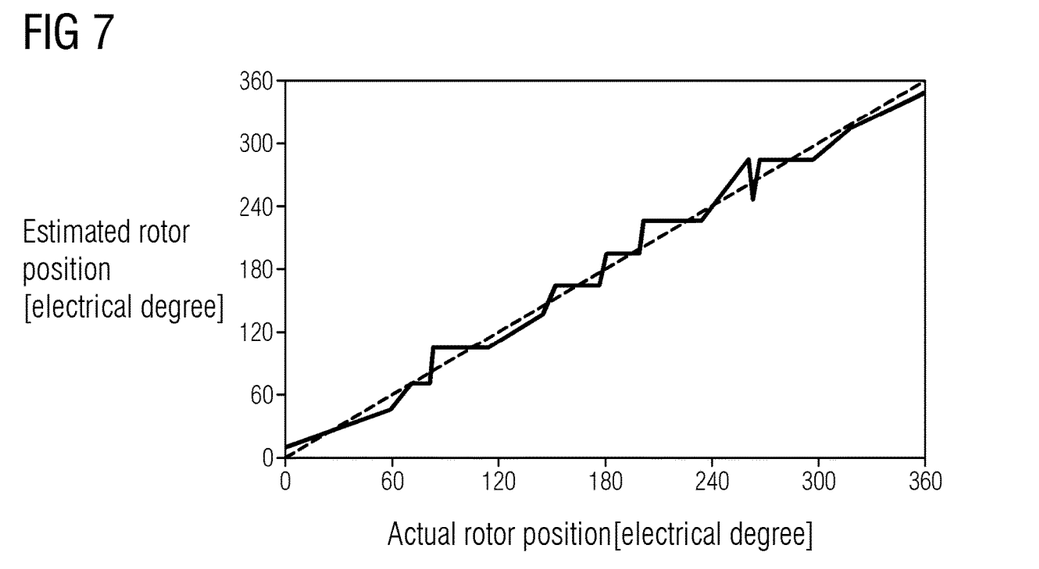
FIG. 7 depicts experimental results for a determination of a rotor position in two different embodiments of the present invention.
Figure 8:
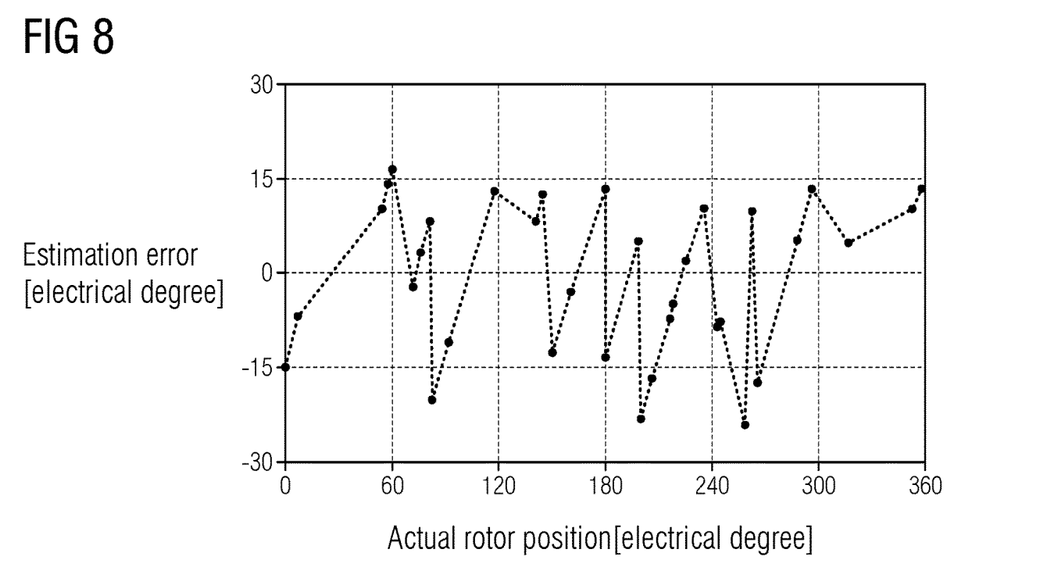
FIG. 8 depicts experimental results for a determination of a rotor position in two different embodiments of the present invention.

A method that involves only the previously discussed steps S1 to S12 except for the comparison to thresholds in steps S3 and S7 was tested for a variety of actual rotor positions. A comparison of the actual rotor positions and the estimated rotor positions is shown in FIG. 7. FIG. 8 shows the error of the estimated position. It is immediately obvious from FIG. 8 that the majority of the actual rotor positions are recognized with an error of less than +/−15°. Some of the actual positions do however cause an error of more than 15°. To allow for an error of less than 15° for all actual rotor position the previously discussed steps S3 and S7 are used and the additional steps S13 to S18 are introduced.

If it is determined in step S3 that the currents 30, 31 induced in the second and third phase 18, 19 are approximately equal it can immediately be determined that the rotational position is approximately 0°, 90°, 180° or 270°. In step S13 the second voltage pulse is therefore applied to the second phase 18 and the current induced in the first phase 17 and the third phase 19 are compared. If the absolute value of the current in the first phase 17 is larger than the absolute value of the current in the third phase 19 the rotational position is either roughly 0° or roughly 180° and the rotor 9 is therefore aligned with the windings 11, 12 of the first phase 17. Otherwise the rotational position is approximately 90° or 270°. Depending on the currents determined in step S14 and step S15 a second selected phase is selected and the voltage pulse is applied to that phase in step S16. If it was determined that the rotor 9 is roughly aligned with the windings 11, 12 of the first phase 17, the polarity is determined by applying a negative voltage pulse to the first phase 17. Otherwise the negative voltage pulse is applied to the second phase 18.

In step S17 the current for the phase to which the third voltage pulse was applied is acquired and in step S18 it is determined, if the current induced by a negative voltage pulse is larger or smaller than the previously acquired current induced by a positive voltage pulse. This polarity determination was already explained with respect to step S11.

If the difference between the second measures for the currents is smaller than the threshold in step S7 it can be determined in dependence on the result of step S4 that the rotational position is either 150° or 330° or 30° or 210°. The polarity is then determined in the steps S16, S17 and S18 as described above.

Figure 9:
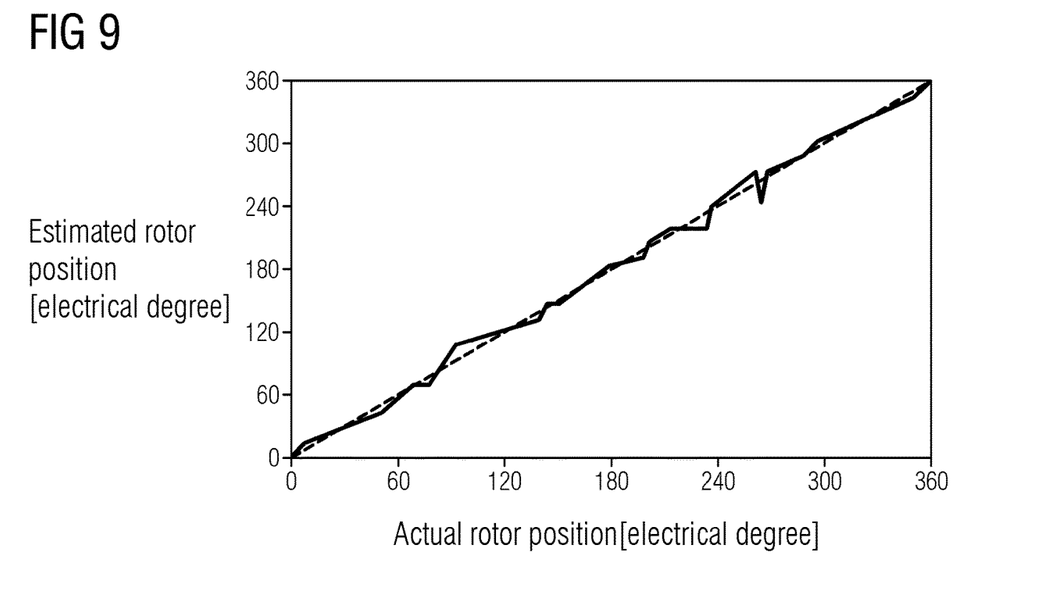
FIG. 9 depicts experimental results for a determination of a rotor position in two different embodiments of the present invention.
Figure 10:
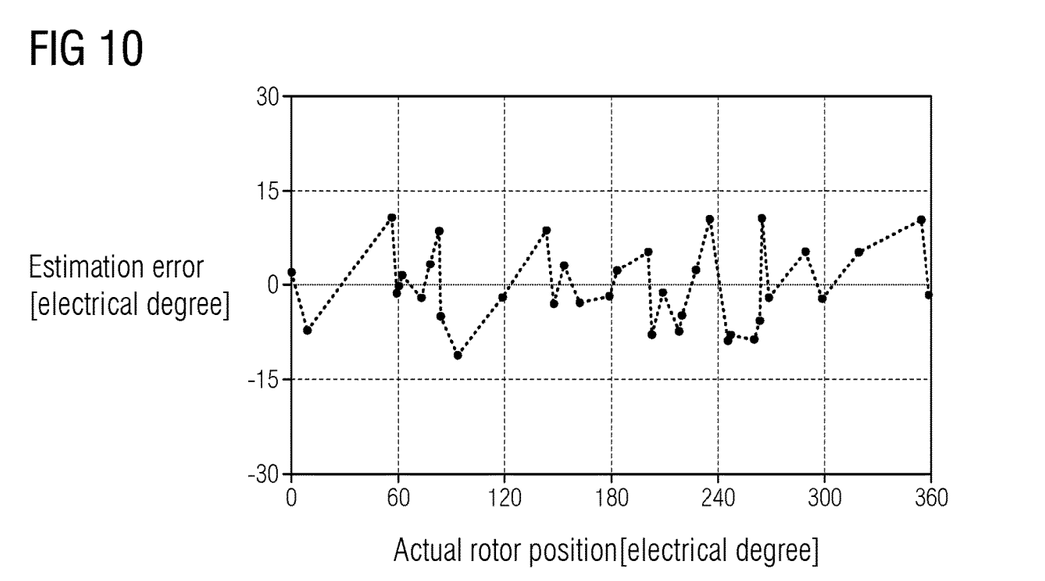
FIG. 10 depicts experimental results for a determination of a rotor position in two different embodiments of the present invention.

As shown in FIGS. 9 and 10 the introduction of these additional steps leads to a closer approximation of the actual rotor position by the estimated rotor position and therefore to an error of the estimation that is reliably smaller than 15°.

A complete set of conditions, results and phases used for the injection of the voltage pulses and the pulse polarities are shown in the following table. All currents i shown are absolute values of the respective currents. To improve readability the first phase 17 was labelled as A, the second phase 18 as B and the third phase 19 as C.

| Step 4 Case | Injection Phase | Step 8 Case | Estimated Position | Injection Phase | Step 11 Case | Sector 60 degree | Step 12 Case | Sector 30 degree |
|---|---|---|---|---|---|---|---|---|
| $i_{B1} > i_{C1}$ | B+ | $i_{A2} > i_{C2}$  $i_{A1} > i_{B2}$ | A | A− | $i_{A1} > i_{A3}$ | 1 | $i_{B3} > i_{C3}$ | 1a |
|  |  |  |  |  |  |  | $i_{B3} < i_{C3}$ | 1b |
|  |  |  |  |  | $i_{A1} < i_{A3}$ | 4 | $i_{B3} > i_{C3}$ | 4a |
|  |  |  |  |  |  |  | $i_{B3} < i_{C3}$ | 4b |
|  |  | $i_{A1} \approx i_{B2}$ | 150°, 330° | B− | $i_{B2} > i_{B3}$ |  | 150° |  |
|  |  |  |  |  | $i_{B2} < i_{B3}$ |  | 330° |  |
|  |  | $i_{A1} < i_{B2}$ | B | B− | $i_{B2} > i_{B3}$ | 3 | $i_{A3} > i_{C3}$ | 3b |
|  |  |  |  |  |  |  | $i_{A3} < i_{C3}$ | 3a |
|  |  |  |  |  | $i_{B2} < i_{B3}$ | 6 | $i_{A3} > i_{C3}$ | 6b |
|  |  |  |  |  |  |  | $i_{A3} < i_{C3}$ | 6a |
|  |  | $i_{A2} < i_{C2}$ | B | B− | $i_{B2} > i_{B3}$ | 3 | $i_{A3} > i_{C3}$ | 3b |
|  |  |  |  |  |  |  | $i_{A3} < i_{C3}$ | 3a |
|  |  |  |  |  | $i_{B2} < i_{B3}$ | 6 | $i_{A3} > i_{C3}$ | 6b |
|  |  |  |  |  |  |  | $i_{A3} < i_{C3}$ | 6a |
|  |  | $i_{A2} \approx i_{C2}$ | B | B− | $i_{B2} > i_{B3}$ |  | 120° |  |
|  |  |  |  |  | $i_{B2} < i_{B3}$ |  | 300° |  |
| $i_{B1} < i_{C1}$ | C+ | $i_{A2} > i_{B2}$  $i_{A1} > i_{C2}$ | A | A− | $i_{A1} > i_{A3}$ | 1 | $i_{B3} > i_{C3}$ | 1a |
|  |  |  |  |  |  |  | $i_{B3} < i_{C3}$ | 1b |
|  |  |  |  |  | $i_{A1} < i_{A3}$ | 4 | $i_{B3} > i_{C3}$ | 4a |
|  |  |  |  |  |  |  | $i_{B3} < i_{C3}$ | 4b |
|  |  | $i_{A1} \approx i_{C2}$ | 30°, 210° | C− | $i_{C2} > i_{C3}$ |  | 210° |  |
|  |  |  |  |  | $i_{C2} < i_{C3}$ |  | 30° |  |
|  |  | $i_{A1} < i_{C2}$ | C | C− | $i_{C2} > i_{c3}$ | 5 | $i_{A3} > i_{B3}$ | 5a |
|  |  |  |  |  |  |  | $i_{A3} < i_{B3}$ | 5b |
|  |  |  |  |  | $i_{C2} < i_{c3}$ | 2 | $i_{A3} > i_{B3}$ | 2a |
|  |  |  |  |  |  |  | $i_{A3} < i_{B3}$ | 2b |
|  |  | $i_{A2} < i_{B2}$ | C | C− | $i_{C2} > i_{c3}$ | 5 | $i_{A3} > i_{B3}$ | 5a |
|  |  |  |  |  |  |  | $i_{A3} < i_{B3}$ | 5b |
|  |  |  |  |  | $i_{C2} < i_{c3}$ | 2 | $0i_{A3} > i_{B3}$ | 2a |
|  |  |  |  |  |  |  | $i_{A3} < i_{B3}$ | 2b |
|  |  | $i_{A2} \approx i_{B2}$ | C | C− | $i_{C2} > i_{c3}$ |  | 240° |  |
|  |  |  |  |  | $i_{C2} < i_{c3}$ |  | 60° |  |

-continued

| Step 4 Case | Injection Phase | Step 8 Case | Estimated Position | Injection Phase | Step 11 Case | Sector 60 degree | Step 12 Case | Sector 30 degree |
|---|---|---|---|---|---|---|---|---|
| $i_{B1} \approx i_{C1}$ | B+ | $i_{A2} > i_{C2}$ | 0°, 180° | A− | $i_{A1} > i_{A3}$ | | | 0° |
| | | | | | $i_{A1} < i_{A3}$ | | | 180° |
| | | $i_{A2} < i_{C2}$ | 90°, 270° | B− | $i_{B2} < i_{B3}$ | | | 270° |
| | | | | | $i_{B2} > i_{B3}$ | | | 90° |

Although the present invention has been described in detail with reference to the preferred embodiment, the present invention is not limited by the disclosed examples from which the skilled person is able to derive other variations without departing from the scope of the invention.

For the sake of clarity, it is to be understood that the use of "a" or "an" throughout this application does not exclude a plurality, and "comprising" does not exclude other steps or elements.

The invention claimed is:

1. A method for determining a rotational position of a rotor in a permanent magnet synchronous machine, wherein a stator comprises windings for a first phase, a second phase, and a third phase, the method comprising:
   applying a first voltage pulse to the first phase;
   determining respective first measures for a current induced by the first voltage pulse in the second phase and the third phase;
   selecting a first selected phase depending on the first measures for the current, wherein the first selected phase is either the second phase or the third phase,
   applying a second voltage pulse to the first selected phase;
   determining respective second measures for the current induced by the second voltage pulse in phases of the stator that are not the first selected phase; and
   determining the rotational position of the rotor depending on the second measures of the current, wherein the step of determining the rotational position of the rotor depending on the second measures of the current further comprises:
   selecting a second selected phase depending on the second measures of the current, wherein the second selected phase is either the first phase or the first selected phase;
   applying a third voltage pulse to the second selected phase;
   determining a respective third measure for the current induced by the third voltage pulse in at least one phase of the stator; and
   determining the rotational position of the rotor depending on the third measure for the current.

2. The method according to claim 1, wherein the first voltage pulse and third voltage pulse or the second voltage pulse and the third voltage pulse are applied to the same phase with opposite polarities.

3. The method according to claim 1, wherein the respective third measure is determined for the current in the second selected phase and/or in the phases of the stator that are not the second selected phase.

4. The method according to claim 3, wherein the determined rotational position depends on the relative magnitudes of the third measures of the current for the phases of the stator that are not the second selected phase.

5. The method according to claim 1, wherein an additional first measure for the current induced by the first voltage pulse in the first phase and/or an additional second measure for the current induced by the second voltage pulse in the selected phase are determined, further wherein the selection of the second selected phase and/or the determined rotational position depend on the additional first and/or the additional second measure for the current.

6. The method according to claim 5, wherein the determined rotational position depends on the relative magnitude of the third measure of the current for the second selected phase and the additional first or the additional second measure of the current.

7. The method according to claim 5, wherein the selection of the second selected phase and/or the determined rotational position depends on the relative magnitude of the additional first and the additional second measure for the current.

8. The method according to claim 5, wherein an absolute value of the difference between the additional first and the additional second measure of the current is compared to a threshold, further wherein the selection of the second selected phase and/or the determined rotational position depend on the result of that comparison.

9. The method according to claim 1, wherein the selection of the first and/or second selected phase and/or the determined rotational position depend on the relative magnitude of the first measures of the current for the second and third phase and/or in that the selection on of the second selected phase and/or the determined rotational position depend on the relative magnitude of the second measures of the current for the phases of the stator that are not the first selected phase.

10. The method according to claim 1, wherein the absolute value of the difference between the first measures of the current for the second and third phase is compared to a threshold, wherein the selection of the first and/or second selected phase and/or the determined rotational position depend on the result of that comparison, and/or in that the absolute value of the difference between the second measures of the current for the phases of the stator that are not the first selected phase is compared to a threshold, wherein the selection of the second selected phase and/or the determined rotational position depend on the result of that comparison.

11. The method according to claim 1, wherein three voltage pulses are applied to determine the rotational position and/or wherein the error in the determined rotational position is smaller than or equal to 15°.

12. A control unit of a permanent magnet synchronous machine, configured to perform the method of claim 1.

13. A computer program product that can be directly loaded into a memory unit of a control unit of a permanent magnet synchronous machine, the computer program product comprising a non-transitory machine-readable storage medium storing instructions for performing the steps of the method of claim 1 when the program is executed on the control unit.

14. A non-transitory computer-readable storage medium containing electronically readable instructions comprising the computer program product according to claim 13.

\* \* \* \* \*